United States Patent Office 2,736,723
Patented Feb. 28, 1956

2,736,723

MERCAPTAN MODIFIED HYDROCARBON POLYMERS

Frederick W. Breuer and Burt F. Hofferth, Manheim Township, Lancaster County, Pa., assignors to Armstrong Cork Company, Lancaster, Pa., a corporation of Pennsylvania No Drawing. Application March 24, 1953, Serial No. 344,461

9 Claims. (Cl. 260—79.5)

This invention relates to modified hydrocarbon polymers. More particularly, the invention relates to the modification of comparatively low-cost hydrocarbon hard and brittle resins by transforming such materials into internally plasticized soft resins capable of being used in the production of a number of items requiring such resinous material, such as, for example, floor tile and the like, and also into comparatively viscous oils which may find application as plasticizers of low vapor pressure and which may be employed as special lubricants and the like. Our invention also relates to a method of modifying such hydrocarbon polymers by incorporation therein of small but effective amounts of high molecular weight mercaptans.

Hydrocarbon resins obtainable from various sources have been employed for a number of years in the manufacture of various resinous products. Typical of these resins are polystyrene, polymethyl styrene, and resins obtained by the polymerization of petroleum fractions which are rich in unsaturated hydrocarbons. These fractions contain not only unsaturated aliphatic hydrocarbons such as cyclopentadiene, methyl cyclopentadiene, and the like, but also contain polymerizable aromatic unsaturates, for example, styrene, methyl styrene, dimethyl styyrene, and homologues thereof. There are also resins which are employed as equivalents of these petroleum resins, such as, for example, resins obtained from coal tar and close cut fractions of coal tar, for example, the coumarone-indene resins. Generally speaking, the petroleum resins and similar hydrocarbon resins which have been more widely used are fairly costly because of the particular requirements placed upon them. For example, in the manufacture of floor tile, many formulations require the presence of a resinous binder which is resistant to alkali, resistant to indentation, and the like. However, the low-cost brittle materials cannot be employed alone in the production of such tiles because they do not present sufficient resiliency to meet the requirements of the trade. There have been some attempts to produce floor tiles with the required characteristics which involves admixing various kinds of hydrocarbon resins or their equivalents to produce a binder having the required properties. However, there are some low-cost brittle materials which even after blending with a higher grade resin do not meet the rather stringent requirements for a tile binder.

As indicated above, the hydrocarbon resins are produced by various methods of polymerization utilizing raw materials from various sources. For example, one source of low-cost resinous material is unsaturated petroleum distillates. Suitable resins can be obtained by subjecting these distillates to heat and/or catalytic polymerization. Generally speaking, the distillates are produced by fractionating the products of high temperature, low pressure pyrolysis of petroleum. Fractions may be used to produce resinous materials rich in polystyrene, as well as resinous materials which are rich in polymethyl styrene.

In accordance with our invention, normally hard and brittle resins are transformed into internally plasticized soft binder and vehicle type products and into viscous oils by heating the resins in the presence of higher molecular weight aliphatic mercaptans and/or aromatic mercaptans. By higher molecular weight aliphatic mercaptans, we intend to include such mercaptans as normal dodecyl mercaptans, tertiary dodecyl mercaptans, octyl mercaptans, and the like. Generally speaking, we obtain advantageous results when the resins are heated in the presence of alkyl mercaptans having from 8 to 22 carbon atoms per molecule. Typical aryl mercaptans are the thiophenols such as thiophenol, ortho thiocresol, meta thiocresol, para thiocresol, thiobeta naphthol, and the like.

The conditions of treatment in accordance with our invention may vary, depending among other things, upon the nature of the raw material, the particular mercaptan employed in the treatment, the activity of the reactants, and the desired qualities to be obtained in the end product. However, generally speaking, we find it advantageous to heat the hydrocarbon resin in the presence of the mercaptan at an elevated temperature, such as 100° C. to 200° C. for a higher period of time of from about 24 to about 72 hours. It is obvious that the higher the temperature of heat treatment, the shorter the time required to accomplish the conversion or modification of the hydrocarbon resin material.

In a particularly advantageous embodiment of our invention, we convert such materials as polystyrene and petroleum hydrocarbon resins; for example, a resin obtained by heating the unsaturated distillates obtained from high temperature, low pressure cracking of a petroleum oil. Such petroleum resins are characterized by an iodine value of 150–220, a softening point of about 100° C., a viscosity of N on the Gardner scale, a color of C–3 to C–6 on the Barrett scale, and a mixed cloud point below 0° C., advantageously —20° C. to —40° C. The average molecular weight of such petroleum resins is at least about 800, as determined by the cryoscopic method employing benzene as a solvent.

If desired, the reaction may be conducted in the presence of a catalyst such as sulfur, selenium, benzoyl peroxide, ultraviolet light, and the like.

Our invention may be more readily understood by reference to the following specific examples:

EXAMPLE I

A mixture containing 75 parts by weight petroleum hydrocarbon resin having a softening point (ring and ball) of about 100° C., 250 parts by weight dodecyl mercaptan, and 0.5 part by weight sulfur was heated at 175° C. for 70 hours. The excess dodecyl mercaptan was stripped from the product at 200° C. and 40 mm. pressure with superheated steam. The yield was 101 parts by weight of a thick dark syrup having an average molecular weight of 643, compared with 819 on the original resin. The sulfur content was 4.56%.

EXAMPLE II

A mixture containing 75 parts by weight petroleum resin having a softening point (ring and ball) of about 96° C., 100 parts by weight meta thiocresol, and 0.5 part by weight sulfur was heated at 175° C. for 24 hours. The meta thiocresol was removed by extraction with dilute sodium hydroxide solution. The resin was washed and then subsequently stripped with superheated steam at 170° C. and 48 mm. pressure. The yield was 91.6 parts by weight of a somewhat soft, slightly tacky dark resin having an average molecular weight of 599, compared with 819 on the original petroleum hydrocarbon resin. The softening point of the petroleum hydrocarbon resin was reduced from 96° C. to 54° C. by introduction of the mercaptans, as well as by degradation of the resin molecules. The sulfur content was 6.19%.

EXAMPLE III

A polystyrene resin was prepared by the addition of 500 parts by weight of pure styrene to a solution of 5.8 ml. of boron fluoride etherate in 1330 ml. of nitroethane at 28° C. to 60° C. The resulting resin had the following properties: softening point (ring and ball), 136° C.; molecular weight, 2743 (cryoscopic). 50 parts by weight of this resin were admixed with 113.3 parts by weight dodecyl mercaptan and 0.35 part by weight sulfur. The resulting mixture was heated at approximately 175° C. for 46 hours. The reaction mixture was stripped with superheated steam under vacuum to give 60.5 parts by weight of resin having a softening point of 83° C. and a molecular weight of 1129. The sulfur content was 3.45%.

EXAMPLE IV 33 parts by weight of polystyrene as prepared in Example III were admixed with 50 parts by weight of meta thiocresol and 0.2 part by weight sulfur. The resulting mixture was heated at 175° C. for 46 hours. The excess meta thiocresol was removed by extraction with dilute sodium hydroxide solution. The yield of pale yellow, tacky resin was 26.5 parts by weight after superheated steam distillation under vacuum at 160° C. The product had a softening point of 95.5° C. and an average molecular weight of 1102.

EXAMPLE V 50 g. of a resin characterized by an iodine value of 207, softening point (ring and ball) 107° C., mixed cloud point 192.5° C., cloud point less than 30° C., viscosity (Gardner-Holdt) Z-2, and average molecular weight (cryoscopic) 1601, were heated with 167 g. of technical dodecyl mercaptan and 0.3 g. of powdered sulfur for 38 hours at 170–190° C. By superheated steam distillation at 210° C. and 45 mm. pressure, low molecular weight products and unreacted dodecyl mercaptan were removed and 82 g. of a soft, viscous material was obtained.

A floor tile was prepared utilizing the mercaptan-treated hydrocarbon polymer of Example V as a plasticizer and its properties compared with those of floor tile made according to standard practice utilizing a hydrocarbon oil-type plasticizer. The petroleum resin employed had the following characteristics: iodine value, 208; softening point (ring and ball), 96° C.; mixed cloud point, 11° C.; viscosity (Gardner-Holdt), N; color (Barrett scale), C-3½; and average molecular weight (cryoscopic), 819.

*Formulations*

| | | |
|---|---|---|
| Petroleum Resin | 152 | 152 |
| Modified Resin | 24 | |
| Oil | | 24 |
| Pitch | 16 | 16 |
| Asbestos | 280 | 280 |
| Limestone (50 mesh) | 320 | 320 |
| Indentations: 77° F.— | | |
| 1 min mils | 6.5, 7.0 | 8.7, 10.1 |
| 10 min | 10.9 | 18.1 |
| 10 min. (max.) | 11.4 | 14.5 |
| 115° F., 30 sec | 27.5, 26.5 | 47.5, 52 |

The use of the modified resin as a plasticizer imparted better indentation properties to the resultant tile.

Our invention has been particularly described with regard to hydrocarbon resins and more particularly the hard, brittle type resins which are unsuitable for use in such fields whereby a soft binderlike material is required, such, for example, as the manufacture of floor tile.

The products resulting in the process of our invention contain sulfur in the form of a sulfide group. Oxidation products, such as sulfoxides, sulfones, and sulfonic acids and their esters can be derived from these products. These sulfonic products are good low temperature plasticizers, and their acid salts may be used as dispersing and emulsifying agents, provided their molecular weight is low enough to make them water soluble. On the other hand, the high molecular weight species containing lower sulfur content is water insoluble and may be employed in various fields where such characteristics are required, such as a cation exchange resin.

In lieu of the mercaptans described hereinabove, other materials containing the sulfhydril or disulfide linkages and containing other functional groups such as halogens, hydroxy, carboxy, and the like, may be used. Various sulfur-containing rubber vulcanization accelerators may be used, such as the tetramethylthiuram monosulfide. Other materials which may be used in place of the mercaptans more particularly described are those in which the sulfur atoms are replaced by selenium atoms.

In the practice of the process of our invention, the excess mercaptan is recoverable and may be used for subsequent treatment of resins.

We claim:

1. A method of converting hard, brittle hydrocarbon resins of the group consisting of polystyrene, polymethyl styrene, resins obtained by polymerization of petroleum fractions rich in unsaturates, and resins obtained from coal tar to useful lower molecular weight plasticizer products which comprises heating the hydrocarbon in the presence of a compound of the group consisting of higher alkyl mercaptans and aromatic mercaptans and separating excess mercaptans from the reaction mass.

2. The product of the process of claim 1.

3. A process of reducing the molecular weight of hard, brittle hydrocarbon resins of the group consisting of polystyrene, polymethyl styrene, resins obtained by polymerization of petroleum fractions rich in unsaturates, and resins obtained from coal tar which comprises heating said resin in the presence of a mercaptan of the group consisting of higher alkyl mercaptans and aromatic mercaptans at a temperature of about 100° C. to about 200° C. and separating excess mercaptans from the reaction mass.

4. A tile comprising petroleum resin obtained by the polymerization of petroleum fractions rich in unsaturates, filler, and the product of the process of claim 3.

5. A process of converting hard, brittle petroleum resins obtained by the polymerization of petroleum fractions rich in unsaturates to useful lower molecular weight products comprising heating said petroleum resin in the presence of a compound of the group consisting of higher alkyl mercaptans and aromatic mercaptans and separating excess mercaptans from the reaction mass.

6. A process of converting high molecular weight polystyrene to useful lower molecular weight plasticizer products which comprises heating polystyrene in the presence of a compound of the group consisting of higher alkyl mercaptans and aromatic mercaptans and separating excess mercaptans from the reaction mass.

7. A method of converting hard, brittle hydrocarbon resins of the group consisting of polystyrene, polymethyl styrene, resins obtained by polymerization of petroleum fractions rich in unsaturates, and resins obtained from coal tar to useful lower molecular weight products which comprises heating said hydrocarbon resin in the presence of an alkyl mercaptan having from 8 to 22 carbon atoms per molecule and separating excess mercaptans from the reaction mass.

8. A method of converting hard, brittle hydrocarbon resins of the group consisting of polystyrene, polymethyl styrene, resins obtained by polymerization of petroleum fractions rich in unsaturates, and resins obtained from coal tar to useful lower molecular weight products which comprises heating said resin in the presence of an aryl mercaptan and separating excess mercaptans from the reaction mass.

9. A method of converting a petroleum hydrocarbon resin obtained by heating the unsaturated distillates obtained from high temperature, low pressure cracking of petroleum oil and having a mixed cloud point below 0° C. and an average molecular weight of at least 800 to useful lower molecular weight plasticizer products which comprises heating said resin in the presence of a compound of the group consisting of higher alkyl mercaptans and aromatic mercaptans at a temprature of about 100° C. to about 200° C. for a time of about 24 to about 72 hours, separating excess mercaptans from the reaction mass, and recovering a low molecular weight plasticizer product.

References Cited in the file of this patent

UNITED STATES PATENTS

| | | |
|---|---|---|
| 2,351,108 | Collins | June 13, 1944 |
| 2,384,070 | Bolton | Sept. 4, 1945 |
| 2,510,808 | Frolich | June 6, 1950 |
| 2,581,092 | Garber | Jan. 1, 1952 |